United States Patent Office 2,761,764
Patented Sept. 4, 1956

2,761,764

PRODUCTION OF GASES CONTAINING SULFUR DIOXIDE

Adolf Johannsen, Ludwigshafen (Rhine), Willi Danz, Ludwigshafen (Rhine)-Oggersheim, Wilhelm Pfannmueller, Mannheim, and Herbert Wolf, Ludwigshafen (Rhine), Germany, assignors to Badische Anilin- & Soda-Fabrik Aktiengesellschaft, Ludwigshafen (Rhine), Germany No Drawing. Application May 1, 1951, Serial No. 224,068

Claims priority, application Germany May 27, 1950

13 Claims. (Cl. 23—177)

This invention relates to improvements in the manufacture of sulfur dioxide-containing gases from sulfur-containing minerals.

According to our prior proposals it is possible to produce gases containing sulfur dioxide by thoroughly roasting sulfidic minerals, in particular pyrites, in a reaction layer consisting proponderatingly of substantially roasted material through which oxygen-containing gases flow upwardly at temperatures below the softening point of the substantially roasted material, the particles of the material being continually in up-and-down whirling motion, comminuted iron pyrites being supplied continuously or periodically to the whirling layer and corresponding amounts of the roasted material being withdrawn therefrom. An hourly loading per square metre of the area of the whirling layer of at the most about 500 kilograms of iron pyrites (sulfur content 40 to 48%) has hitherto been employed.

We have now found that the said roasting process can be carried out with a very small need of volume and with excellent results by supplying the sulfidic minerals to the whirling layer in a grain size up to 10 millimetres, advantageously up to 6 millimetres, in such an amount that the hourly loading per square metre of the area of the whirling layer corresponds to more than 250 kilograms of sulfur content of the material to be roasted. At least as much oxygen is supplied in the form of an oxygen-containing gas as is necessary for a practically complete roasting of the sulfidic mineral with the formation of oxidic roasted material, and the roasting temperature is kept below the softening point of the substantially roasted material by employing an excess of oxygen-containing gas and/or by returning cooled roaster gas and/or cold roasted material into the roaster and/or by heat-consuming processes carried out at the same time in the reaction layer and/or by the arrangement of heat-withdrawing members.

In the case that the roasted material should have a low structural stability, there thus takes place, by reason of the strong turbulence in the whirling layer, a substantial disintegration and abrasion of the roasted material. Countermeasures are taken where possible against the entrainment of the roasted material in the form of flute dust by the provision of rest zones above the whirling layer. The flue dust entrained by the roaster gas from the rest zones is precipitated in known manner in subsequent dust collectors or cyclone separation chambers, and then a fine purification of the gas in the usual way by means of electrostatic gas purification chambers may be performed.

In the case of minerals having great stability of shape, in particular those which contain ingrown coarse-pieced hard constituents of gangue, these constituents which are difficult to disintegrate and abrade are retained in the whirling layer. They can be withdrawn from the layer, when necessary at various heights according to the grain size. A special advantage of the present process is that in the working up of such gangue-rich minerals a separation of the material is automatically obtained during the roasting, namely into an iron-rich flue dust fraction which, if necessary after agglomeration, is directly suitable for a further metallurgical processing, and a roasted fraction consisting predominantly of gangue particles and having a low iron content.

The amount of oxygen-containing gas introduced into the whirling layer is preferably adapted to the supply of the sulfidic minerals so that roasting gases having a high sulfur dioxide content are formed. If, however, in order to obtain this result, for example in the roasting of Spanish iron pyrites (48% of sulfur) with air, the amount of air theoretically necessary for the roasting of the sulfur and for the formation of oxidic roasted material ($Fe_2O_3$) were to be used, there would be a calculated rise in temperature of the reactants (introduced cold) from normal temperature to about 1700° C. This undesirable increase in temperature is counteracted by employing an excess of air. By employing such amounts of air that a roaster gas containing about 6% of sulfur dioxide is formed, there results, with adiabatic course, an increase in temperature up to about 850° C. such as is favourable for roasting Spanish pyrites. In the case of gangue-rich sulfur minerals containing about 75% of pyrites and about 10% of zinc blende, the optimum roasting temperature lies at about 1000° C. This temperature is attained by adjusting the amount of roasting air so that 8.5% roaster gases are obtained. Roaster gases having a sulfur dioxide content of 6 to 8.5% are frequently worked up in sulfuric acid plants according to the chamber or contact system. The production of such dilute gases has, however, a certain economic disadvantage in that voluminous apparatus are necessary for purifying and cooling these low concentration gases. It is more advantageous first to produce roaster gases richer in sulfur dioxide and then after their purification to dilute them with air to the concentration favourable for carrying out the subsequent steps.

In order to obtain roaster gases richer in sulfur dioxide it is necessary to withdraw heat from the whirling layer, and indeed such withdrawal is increasingly necessary with increasing dimensions of the reaction furnace and correspondingly reduced heat losses, in order to preclude an increase of the temperature above the softening point of the substantially roasted material. This may be effected for example by evaporation of sprayed-in water or decomposition of introduced waste sulfuric acid, by the introduction of cold roasted material or flue dust or by returning cooled roaster gas or by withdrawal of heat by means of heat-absorbing members with the production of hot water or superheated stream or by the conjoint employment of two or more of these measures.

If sulfides having a considerable content of very finely-grained constituents are introduced into the layer, it is recommended that the oxygen-containing gases should in part be blown, instead of from below, tangentially or radially into the upper part of the whirling layer or above the surface of the layer. In this way a complete after-combustion of any entrained finely-grained constituents of the unburnt reaction material can be obtained.

The amounts of air necessary for the complete roasting of the same amounts of sulfur in sulfur minerals of different compositions lie within relatively narrow limits. Thus for the thorough roasting of the sulfur in sulfur minerals of the type of zinc blende (ZnS) or bismuth glance ($Bi_2S_3$) each metric ton of sulfur requires at least about 5000 cubic metres of roasting air, whereas in the case of sulfur-richer sulfides of the type of pyrites (FeS$_2$) an about 8.4% smaller amount of air is required and in the case of sulfur-poor iron-containing ores of the type of magnetic pyrites (Fe$_7$S$_8$) and copper pyrites (CuFeS$_2$) an about 10% larger amount of air (about 5500 cubic metres) is necessary. On the other hand, since a whirling motion in the reaction layer can be maintained with loadings of the roasting surface with air in the range between less than 1000 and more than 3000 cubic metres per square metre per hour, there is no difficulty in adapting the roasting conditions to the material to be roasted. Minerals which are very poor in sulfur, such as lead glance (containing 13.4% of sulfur as the pure mineral) are preferably roasted, as in prior roasting practice, together with ores richer in sulfur, as for example pyrites. Lead glance minerals usually per se contain constituents richer in sulfur, such as pyrites or zinc blende.

The piled weight of the roasted residues of the various sulfur minerals (which weight may in a first approximation serve as a measure of the ease with which the reaction layer may be kept in whirling motion) also does not show any considerable difference. Thus in the case of roasted residues of high specific gravity it is possible to influence their readiness for being kept in whirling motion in a favourable sense by reducing the grain size of the minerals to be worked up. The use of a material of a not too high grain size is especially to be recommended when reduction in the grain size does not take place or takes place only to a negligible extent in the whirling layer by disintegration or abrasion.

The average dwell period of the material to be roasted, in the whirling layer for a given area-loading with sulfur and air can be increased by increasing the height of the whirling layer. A further possibility for adjusting the roasting conditions is provided by regulation of the roasting temperature. This is limited upwardly by the softening point of the substantially roasted material.

The following example will further illustrate this invention but the invention is not limited to this example.

Example

Into a whirling layer consisting of substantially roasted material, which in the quiescent state has a height of 50 centimetres, there are introduced per hour per square metre of the area of the layer about 1350 kilograms of iron pyrites of Spanish origin having a sulfur content of 48%. The iron pyrites has been comminuted to a grain size of 0 to 4 millimetres. The loading with sulfur corresponds to about 650 kilograms per square metre of the area of the layer per hour. About 2900 cubic metres of air for each square metre of roasting surface per hour (about 4475 cubic metres per metric ton of sulfur) are passed upwardly through the whirling layer. The temperature in the whirling layer is kept at about 850° C. by spraying in water. The iron pyrites introduced into the hot whirling layer thus undergoes a considerable comminution by decrepitation and abrasion. The entrainment of the roasted material as flue dust is counteracted by providing above the whirling layer a quiescent chamber which preferably widens conically in the direction of flow of the gas. The residual entrained dust is precipitated in a subsequent separation chamber. The height of the whirling layer is kept constant during the carrying out of the process by withdrawing roasted material from the whirling layer through an overflow pipe.

Practically oxygen-free roasting gases are obtained having a sulfur dioxide content of about 15%. The sulfur content of the roasted material and of the flue dust is less than 1.5%.

Whereas for the roasting of iron pyrites in mechanical furnaces 9 to 10 cubic metres of furnace volume are required per day-ton of pyrites, and in rotary furnaces 6 cubic metres of furnace volume are required, the process according to the present invention requires only 0.2 cubic metre of furnace volume per day-ton of pyrites.

Reference is made to copending application Serial No. 215,832, filed March 15, 1951, which is a description of an apparatus suitable for the practice of the present invention.

What we claim is:

1. In a process for the production of gases containing sulfur dioxide by roasting a sulfidic mineral in a reaction layer consisting of both roasted and unroasted particles through which oxygen-containing gases are passed upwardly to produce a random turbulent motion of the solid particles within the confines of the layer, the improvement which comprises supplying sulfidic mineral having a grain size of up to about 10 millimetres to a turbulent layer having substantially the same degree of agitation throughout in such an amount that the hourly loading per square metre of layer area corresponds to more than 250 kilograms of sulfur content of the mineral to be roasted and that the layer consists mainly of roasted particles, supplying an amount of oxygen in the form of an oxygen-containing gas at least sufficient for the practically complete roasting of the sulfidic mineral with the formation of oxidic roasted material, and maintaining the roasting temperature below the softening point of the substantially roasted material.

2. A process as claimed in claim 1 wherein the roasting temperature is maintained below the softening point of the substantially roasted material by returning cooled roaster gas to the turbulent layer.

3. A process as claimed in claim 1 wherein the roasting temperature is maintained below the softening point of the substantially roasted material by returning cold roasted material to the turbulent layer.

4. A process as claimed in claim 1 wherein the roasting temperature is maintained below the softening point of the substantially roasted material by withdrawing heat from the turbulent layer by simultaneously carrying out an endothermic process in the turbulent layer.

5. A process as claimed in claim 1 wherein the roasting temperature is maintained below the softening point of the substantially roasted material by withdrawing heat from the turbulent layer by heat exchange members located in the turbulent layer.

6. In a process for the production of gases containing sulfur dioxide by roasting a sulfidic mineral in a reaction layer consisting of both roasted and unroasted particles through which oxygen-containing gases are passed upwardly to produce a random turbulent motion of the solid particles within the confines of the layer, the improvement which comprises supplying sulfidic mineral having a grain size of up to about 10 millimetres to a turbulent layer having substantially the same degree of agitation throughout in such an amount that the hourly loading per square metre of layer area corresponds to at least about 650 kilograms of sulfur content of the mineral to be roasted and that the layer consists mainly of roasted particles, supplying an amount of oxygen in the form of an oxygen-containing gas at least sufficient for the practically complete roasting of the sulfidic mineral with the formation of oxidic roasted material, and maintaining the roasting temperature below the softening point of the substantially roasted material.

7. In a process for the production of gases containing sulfur dioxide by roasting a sulfidic mineral in a reaction layer consisting of both roasted and unroasted particles through which air is passed upwardly to produce a random turbulent motion of the solid particles within the confines of the layer, the improvement which comprises supplying sulfidic mineral having a grain size of up to about 10 millimetres to a turbulent layer having substantially the same degree of agitation throughout in such an amount that the hourly loading per square metre of layer area corresponds to more than 250 kilograms of sulfur content of the mineral to be roasted and that the layer consists mainly of roasted particles, supplying at least about 4475 cubic metres of roasting air per metric ton of sulfur for mineral of the type of pyrites, at least about 5000 cubic metres for mineral of the type of zinc blende and bismuth glance, and at least about 5500 cubic metres for mineral of the type of magnetic pyrites and copper pyrites, and maintaining the roasting temperature below the softening point of the substantially roasted material.

8. In a process for the production of gases containing sulfur dioxide by roasting a sulfidic mineral in a reaction layer consisting of both roasted and unroasted particles through which oxygen-containing gases are passed upwardly to produce a random turbulent motion of the solid particles within the confines of the layer, the improvement which comprises supplying sulfidic mineral having particles distributed in grain size up to about 4 millimetres to a turbulent layer having substantially the same degree of agitation throughout in such an amount that the hourly loading per square metre of layer area corresponds to more than 250 kilograms of sulfur content of the mineral to be roasted and that the layer consists mainly of roasted particles, supplying an amount of oxygen in the form of an oxygen-containing gas at least sufficient for the practically complete roasting of the sulfidic mineral with the formation of oxidic roasted material, and maintaining the roasting temperature below the softening point of the substantially roasted material.

9. In a process for the production of gases containing sulfur dioxide by roasting a sulfidic mineral in a reaction layer consisting of both roasted and unroasted particles through which air is passed upwardly to produce a random turbulent motion of the solid particles within the confines of the layer, the improvement which comprises supplying sulfidic mineral having particles distributed in grain size up to about 4 millimetres to a turbulent layer having substantially the same degree of agitation throughout in such an amount that the hourly loading per square metre of layer area corresponds to at least about 650 kilograms of sulfur content of the mineral to be roasted and that the layer consists mainly of roasted particles, supplying at least about 4475 cubic metres of roasting air per metric ton of sulfur for mineral of the type of pyrites, at least about 5000 cubic metres for mineral of the type of zinc blende and bismuth glance, and at least about 5500 cubic metres for mineral of the type of magnetic pyrites and copper pyrites, and maintaining the roasting temperature below the softening point of the substantially roasted material.

10. A process for the production of gases containing sulfur dioxide which comprises roasting a sulfidic mineral in a reaction layer consisting of both roasted and unroasted particles, passing oxygen-containing gases upwardly through said layer at a rate within the range of about 1000 to about 3000 cubic metres per square metre of layer area per hour to produce a random turbulent motion of the solid particles within the confines of the layer so that the layer has substantially the same degree of agitation throughout, supplying sulfidic mineral having a grain size of up to about 10 millimetres to said layer in such an amount that the hourly loading per square metre of layer area corresponds to more than 250 kilograms of sulfur content of the mineral to be roasted and that the layer consists mainly of roasted particles, supplying an amount of oxygen in the form of an oxygen-containing gas at least sufficient for the practically complete roasting of the sulfidic mineral with the formation of oxidic roasted material, and maintaining the roasting temperature below the softening point of the substantially roasted material.

11. A process for the production of gases containing sulfur dioxide which comprises roasting a sulfidic mineral in a reaction layer consisting of both roasted and unroasted particles, supplying sulfidic mineral having particles distributed in grain size up to about 4 millimetres to said layer in such an amount that the hourly loading per square metre of layer area corresponds to more than 250 kilograms of sulfur content of the mineral to be roasted and that the layer consists mainly of roasted particles, passing a maximum of about 5500 cubic metres of air per metric ton of sulfur upwardly through said layer to produce a random turbulent motion of the solid particles within the confines of the layer so that the layer has substantially the same degree of agitation throughout and to supply oxygen for roasting, and maintaining the roasting temperature below the softening point of the substantially roasted material.

12. A process for the production of gases containing sulfur dioxide which comprises roasting pyrites in a reaction layer consisting of both roasted and unroasted particles, passing air upwardly through said layer to produce a random turbulent motion of the solid particles within the confines of the layer so that the layer has substantially the same degree of agitation throughout, supplying pyrites having particles distributed in grain size up to about 4 millimetres to said layer in such an amount that the hourly loading per square metre of layer area corresponds to at least about 650 kilograms of sulfur content of the pyrites to be roasted and that the layer consists mainly of roasted particles, supplying at least about 4475 cubic metres of roasting air per metric ton of sulfur, and maintaining the roasting temperature at about 850° C. to 1000° C. and below the softening point of the substantially roasted material.

13. A process for the production of gases containing sulfur dioxide which comprises roasting pyrites in a reaction layer consisting of both roasted and unroasted particles, supplying pyrites having particles distributed in grain size up to about 4 millimetres to said layer in such an amount that the hourly loading per square metre of layer area corresponds to at least about 650 kilograms of sulfur content of the pyrites to be roasted and that the layer consists mainly of roasted particles, passing about 4475 to 5500 cubic metres of air per metric ton of sulfur upwardly through said layer to produce a random turbulent motion of the solid particles within the confines of the layer so that the layer has substantially the same degree of agitation throughout and to supply oxygen for roasting, maintaining the roasting temperature at about 850° C. to 1000° C. and below the softening point of the substantially roasted material, and maintaining the height of said layer constant by withdrawing roasted material, the amount of pyrites supplied, the amount of air supplied and the temperature being adjusted to produce roasted material having a sulfur content of less than about 1.5% and roaster gases substantially free of oxygen.

References Cited in the file of this patent

UNITED STATES PATENTS

| | | |
|---|---|---|
| 1,134,846 | Hall | Apr. 6, 1915 |
| 1,884,348 | Stimmel et al. | Oct. 25, 1932 |
| 1,893,913 | Saint-Jacques | Jan. 10, 1933 |
| 1,912,621 | Clark | June 6, 1933 |
| 1,941,592 | Bacon et al. | Jan. 2, 1934 |
| 2,047,995 | Cordy et al. | July 21, 1936 |
| 2,077,028 | Bacon et al. | Apr. 13, 1937 |
| 2,174,185 | Carter | Sept. 26, 1939 |
| 2,536,099 | Schleicher | Jan. 2, 1951 |
| 2,591,595 | Ogorzaly | Apr. 1, 1952 |
| 2,596,954 | Heath | May 13, 1952 |
| 2,621,118 | Cyr | Dec. 9, 1952 |
| 2,625,464 | Roberts | Jan. 13, 1953 |

FOREIGN PATENTS

| | | |
|---|---|---|
| 587,774 | Great Britain | May 6, 1947 |